Sept. 5, 1933.  B. F. WOOD  1,925,913
DRIP PREVENTING MEANS
Filed Aug. 20, 1932

Inventor,
BENJAMIN F. WOOD.
By William A. Deane
his Attorney

Patented Sept. 5, 1933

1,925,913

UNITED STATES PATENT OFFICE 1,925,913

DRIP PREVENTING MEANS

Benjamin F. Wood, New York, N. Y., assignor of one-half to Robert F. Kerkam, New York, N. Y.

Application August 20, 1932. Serial No. 629,700

7 Claims. (Cl. 65—31)

This invention is directed to a means for preventing drip from the spout of a liquid container in a manner to insure that the liquid, which would otherwise drip from the spout, is drawn back into the container through the utilization of natural laws.

It has been heretofore proposed to provide within the limits of the spout of a container a shallow groove with a view to providing a channel through which the liquid accumulating in the spout will be delivered back into the container. The difficulty in this type of drip-preventing means is that the effective action is incident to the force of gravity, and while ordinarily the accumulated liquid in the spout which will be affected by the force of gravity, when the container is upright, will flow back into the container, that portion of the liquid below the highest point of the groove or channel will still be delivered from the spout by drip.

The present invention aims to take advantage of the natural laws of surface tension of a liquid. In providing for the utilization of these laws, the drip channel is such as to insure the requisite surface tension to restrain or prevent the liquid, even below the highest point of the spout, from gravital delivery from the spout, with the further provision of the channel to such a length within the container as to insure the requisite action to draw all of the liquid in the channel back into the container.

To this end, the invention primarily consists in providing a relatively small-drip-receiving channel, the delivery terminal of which is at the extreme point of the spout and which extends from said delivery end lengthwise of the spout and down the wall of the container to a point below the level of the spout and into the liquid in the container at whatever height the surface of the said liquid may be. With this construction, the tendency of the liquid at the spout end of the channel to fall by gravity is prevented by surface tension. As the innermost end of the groove is below the spout end thereof and below the surface of the fluid in the container, there is an action that draws all of the liquid in the channel or groove back into the container.

The invention is illustrated in the accompanying drawing, wherein:—

Figures 1, 2:
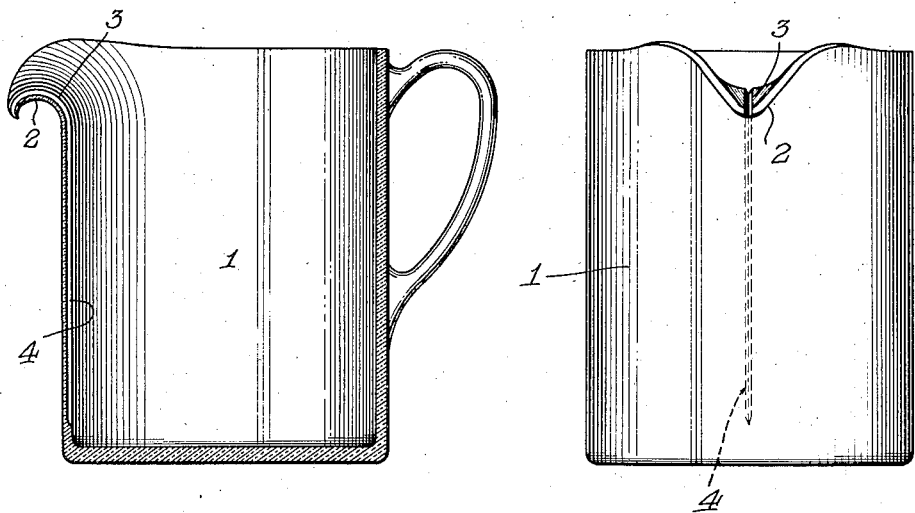
Figure 1 is a vertical sectional view of a container showing the improved drip groove therein.
Figure 2 is a front elevation of the same.

In the drawing, there is shown a conventional form of container 1 having a pouring spout 2. A drip-preventing groove or channel 3 extends from the lip of the spout throughout the length of the latter and is continued downwardly in the wall of the container, terminating at point 4 materially below the spout and preferably to the bottom of the container as shown.

Figure 3:
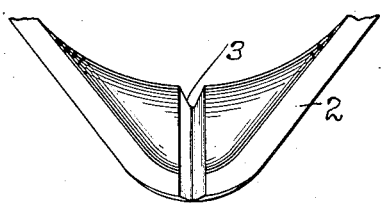
Figure 3 is an enlarged front elevation, showing the delivery end of the groove.

The groove 3 is of comparatively minute proportions and in the form shown is V-shaped in cross section, the apex of the V being preferably rounded slightly, as the avoidance of angles increases the probability that the desired continuous fluid skin or membrane surface will not be ruptured and prevents drop formation of the liquid. That portion of the groove within the spout as shown extends to the lower end of the spout and, as indicated in Figure 3, the bottom of the groove 3 is the extreme lowest point of the spout.

Under these conditions, after pouring from the container and in returning the latter to normal position, the liquid which would otherwise form a drip from the spout remains in the channel 3. The channel functions immediately and the liquid therein which in the now downturned portion of the groove in the forward portion of the spout would otherwise tend to drip from the spout is effectively prevented from so doing by the surface tension of the liquid. This surface tension causes the extreme spout end of the liquid column, under the usual meniscus formatiton, to be held against delivery and withdrawn.

By reason of the fact that the end 4 of the groove or channel 3 is normally submerged, and as a result thereof, all of the liquid throughout the full length of the channel 3 is drawn back into the body of the container. It will be understood that the volume of liquid to be restrained against delivery by the surface tension is comparatively small, that is the surface enclosing the drop is relatively small in comparison to the surface of the fluid in the container to which it is cohesively joined, but this body of liquid is that which ordinarily constitutes the drip. By the arrangement described it is initially prevented from drip delivery by the surface tension and then is drawn backward toward the surface of the liquid within the container, thus effectively preventing drip.

The V-shape of the groove has been found by experiment to be particularly adapted for the purposes of the present invention and for use with different liquids of varying physical characteristics. Thus, for example, water may accumulate in the groove to a certain height while milk will accumulate in the groove to a less height. It is to be understood, however, that the invention is not restricted to the use of V-shaped grooves as grooves of other configurations may be employed as well, it being pointed out that the presence of angles as in grooves rectangular in cross-section increases the possibility of rupture of the desired continuous surface membrane with consequent drop formation. Under certain conditions of use with various materials, the preferred V-shape may be modified so long as sufficient surface tension is secured.

The depth and width of the groove is to be determined more or less by the length of the spout or lip, the groove being narrower and thinner in proportion to the increased length of the pouring lip or spout. It will be understood that the drop forms when the forces of surface tension are overcome by the effects of gravity.

The invention is to be distinguished from drip restraining grooves which do not extend to the extreme end of the lip on the one hand and to a point materially below the lip and below the surface of the fluid in the container on the other hand, for with such a character of groove the liquid in the groove is not drawn back into the container and drip is not effectively prevented.

While the showing is of a conventional form of a container, with a simple type of pouring lip, it is to be understood that the invention is applicable to all types of containers having a pouring means and will function with substantially any liquid.

I claim:—

1. A liquid container having a pouring lip, said container and lip being formed with a continuous, capillary channel formed to prevent drip at the delivery end by surface tension of the liquid, the channel in the container formed of a length sufficient to be submerged at the foot in the body of the liquid in the container and to draw the liquid held by surface tension back into the container regardless of the height of the liquid therein.

2. A liquid container having a pouring lip, said lip having a continuous, capillary channel therein, the wall of the container having a similar channel extending substantially to the bottom of the container and continuously joined to the channel in the lip.

3. A liquid container having a pouring lip, said lip and container wall being formed with a continuous, capillary channel, that end of the channel within the lip extending to the extreme lowest point of the lip and the inner end of said channel terminating at such a point as to be normally submerged when said container is in a position of rest and containing sufficient liquid for use.

4. A liquid container having a pouring lip, said lip and container wall being formed with a continuous, capillary channel of V-shape in cross section, that end of the channel within the lip extending to the extreme lowest point of the lip, with the apex of the channel forming the lowest point, and the inner end of said channel terminating at such a point as to be normally submerged when said container is in a position of rest and containing sufficient liquid for use.

5. A liquid container having a pouring lip, said lip and container wall being formed with a continuous, capillary channel of V-shape in cross section, that end of the channel within the lip extending to the extreme lowest point of the lip, the opposite end of the channel terminating materially below the pouring lip within the container and below the level of the liquid therein.

6. A liquid container having a pouring lip, said lip and container wall being formed with a continuous, capillary channel therein, the inner end of said channel extending substantially to the bottom of said container.

7. A liquid container having a pouring lip, said lip and container wall being formed with a continuous, capillary channel, that end of the channel within the lip extending to the extreme lowest point of the lip, the opposite end of the channel terminating materially below the pouring lip within the container and below the lowest level to which the liquid in said container extends in normal usage.

BENJAMIN F. WOOD.